(12) United States Patent
Georges et al.

(10) Patent No.: US 10,773,625 B2
(45) Date of Patent: Sep. 15, 2020

(54) HEADREST FOR A MOTOR VEHICLE SEAT

(71) Applicant: TESCA FRANCE, Paris (FR)

(72) Inventors: Laurent Georges, Roizy (FR); Grégory Herve, Betton (FR)

(73) Assignee: TESCA France, Paris (FR)

( * ) Notice: Subject to any disclaimer, the term of this patent is extended or adjusted under 35 U.S.C. 154(b) by 0 days.

(21) Appl. No.: 16/081,295

(22) PCT Filed: Feb. 28, 2017

(86) PCT No.: PCT/FR2017/050452
§ 371 (c)(1),
(2) Date: Aug. 30, 2018

(87) PCT Pub. No.: WO2017/149241
PCT Pub. Date: Sep. 8, 2017

(65) Prior Publication Data
US 2019/0023164 A1    Jan. 24, 2019

(30) Foreign Application Priority Data
Mar. 1, 2016 (FR) .................................. 16 51685

(51) Int. Cl.
*B60N 2/818* (2018.01)
*B60N 2/815* (2018.01)
*B60N 2/894* (2018.01)

(52) U.S. Cl.
CPC ............ *B60N 2/818* (2018.02); *B60N 2/815* (2018.02); *B60N 2/894* (2018.02)

(58) Field of Classification Search
None
See application file for complete search history.

(56) References Cited

U.S. PATENT DOCUMENTS

| 2012/0080925 | A1* | 4/2012 | Steinmetz | B60N 2/815 297/391 |
| 2012/0235460 | A1 | 9/2012 | Fey et al. | |
| 2013/0069412 | A1* | 3/2013 | Tscherbner | A47C 7/38 297/391 |
| 2014/0327288 | A1 | 11/2014 | Groenninger et al. | |
| 2016/0243965 | A1* | 8/2016 | Hoffmann | B60N 2/815 |

FOREIGN PATENT DOCUMENTS

EP    2660100 A1    11/2013

OTHER PUBLICATIONS

International Search Report issued in corresponding application No. PCT/FR2017/050452, dated Jun. 26, 2017.

* cited by examiner

*Primary Examiner* — David R Dunn
*Assistant Examiner* — Christopher E Veraa
(74) *Attorney, Agent, or Firm* — Murtha Cullina LLP

(57) ABSTRACT

The invention relates to a headrest having two rods (2), at least one having a locking detents, a housing with two channels and two sets of bearings, each set comprising a top bearing and a bottom bearing. Each bearing set is mounted in a corresponding channel by fitting these bearings into receptacles. The bearings have openings in which the rod can slide and a locking device for locking the housing relative to the rods in a plurality of vertical positions. The device includes at least one locking projection movable relative to the housing between a locking position and an unlocking position. The two rods are part of a frame formed by a metal tube bent to take the general shape of an inverted U with the rods corresponding to the legs of the U.

6 Claims, 5 Drawing Sheets

HEADREST FOR A MOTOR VEHICLE SEAT

CROSS-REFERENCE TO RELATED APPLICATION

This application claims the benefit of International application number PCT/FR2017/050452, filed Feb. 28, 2017 and French patent application number 1651685, filed on Mar. 1, 2016, the entire contents of which are incorporated herein by reference.

TECHNICAL FIELD

The invention relates to a headrest for a motor vehicle seat.

BACKGROUND

It is known to produce a headrest for a motor vehicle seat, the headrest comprising:
- two parallel metal tubular rods for connecting to the seat intended to be mounted at the top of the back of said seat, the rods being in the form of two separate pieces, at least one of the rods being provided with locking detents,
- a moulded plastic housing for absorbing energy in the event of impact of a passenger's head on the headrest, the housing being moulded in one piece, the housing comprising two channels in which the rods can slide,
- a lining pad of the housing whereon a passenger's head can rest,
- two sets of bearings each comprising a top bearing and a bottom bearing, each of the sets being mounted in a corresponding channel by fitting the bearings into receptacles provided in the housing, the receptacles being arranged so as to enable transverse travel of the bearings on either side of a nominal position, the bearings being provided with an opening in which the corresponding rod can slide,
- a device for locking the housing relative to the rods in a plurality of vertical positions, so as to enable height adjustment of said pad, the device comprising at least one locking projection movably mounted relative to the housing between a locking position, where the projection is inserted into one of the detents, and an unlocking position, where the projection is removed from the detent so as to release the sliding of the corresponding rod.

Moulding the housing in one piece makes it possible to limit the risks of rupture of the housing that may be observed when the housing is formed by two half-shells welded to one another.

However, providing two separate rods has various drawbacks:
- the mechanical strength of the headrest is not satisfactory insofar as the rods form with the housing three separate pieces subject to micro-movements relative to one another; due to the multiplication of the degrees of freedom, there is a multiplication of the noise sources associated with the vibrations of the various pieces relative to one another,
- moreover, proper sliding of the housing on the rods may be impeded due to micro-movements of one rod relative to another potentially creating arching phenomena,
- for this reason, such an arrangement requires arranging bearings of significant height, to ensure proper guidance of the rods and counteract the factors of poor sliding mentioned above, which may be incompatible with the space available to house the bearings.

SUMMARY OF THE INVENTION

The aim of the invention is that of remedying these drawbacks.

To this end, the invention relates to a headrest for a motor vehicle seat, the headrest comprising:
- two parallel rods for connecting to the seat intended to be mounted at the top of the back of the seat, at least one of the rods being provided with locking detents,
- a moulded plastic housing for absorbing energy in the event of impact of a passenger's head on the headrest, the housing being moulded in one piece, the housing comprising two channels in which the rods can slide,
- a lining pad of the housing whereon a passenger's head can rest,
- two sets of bearings each comprising a top bearing and a bottom bearing, each of the sets being mounted in a corresponding channel by fitting the bearings into receptacles provided in the housing, the receptacles being arranged so as to enable transverse travel of the bearings on either side of a nominal position, the bearings being provided with an opening in which the corresponding rod can slide,
- a device for locking the housing relative to the rods in a plurality of vertical positions, so as to enable height adjustment of the pad, the device comprising at least one locking projection movably mounted relative to the housing between a locking position, where the projection is inserted into one of the detents, and an unlocking position, where the projection is removed from the detent so as to release the sliding of the corresponding rod,
- the rods being part of a frame formed by a metal tube bent to take the general shape of an inverted U, the rods corresponding to the legs of the U.

In this description, spatial positioning terms (top, bottom, longitudinal, transversal, front, vertical, etc.) are adopted with reference to a headrest mounted in the vehicle.

With the proposed arrangement, the following effects are observed:
- the mechanical strength of the headrest is enhanced notably insofar as the rods form with the housing merely two separate pieces, which restricts the degrees of freedom of the whole; noise sources are thereby reduced;
- moreover, the sliding of the rods is enhanced due to the fact that the rods are perfectly positioned relative to one another by means of the central part of the U-shaped frame, which makes it possible to prevent "crab motion" phenomena impeding sliding,
- for this reason, such an arrangement makes it possible to arrange low bearings readily housed in the housing.

BRIEF DESCRIPTION OF THE DRAWINGS

Further specificities and advantages of the invention will emerge in the following description, with reference to the attached figures, wherein.

DETAILED DESCRIPTION

Figure 1:
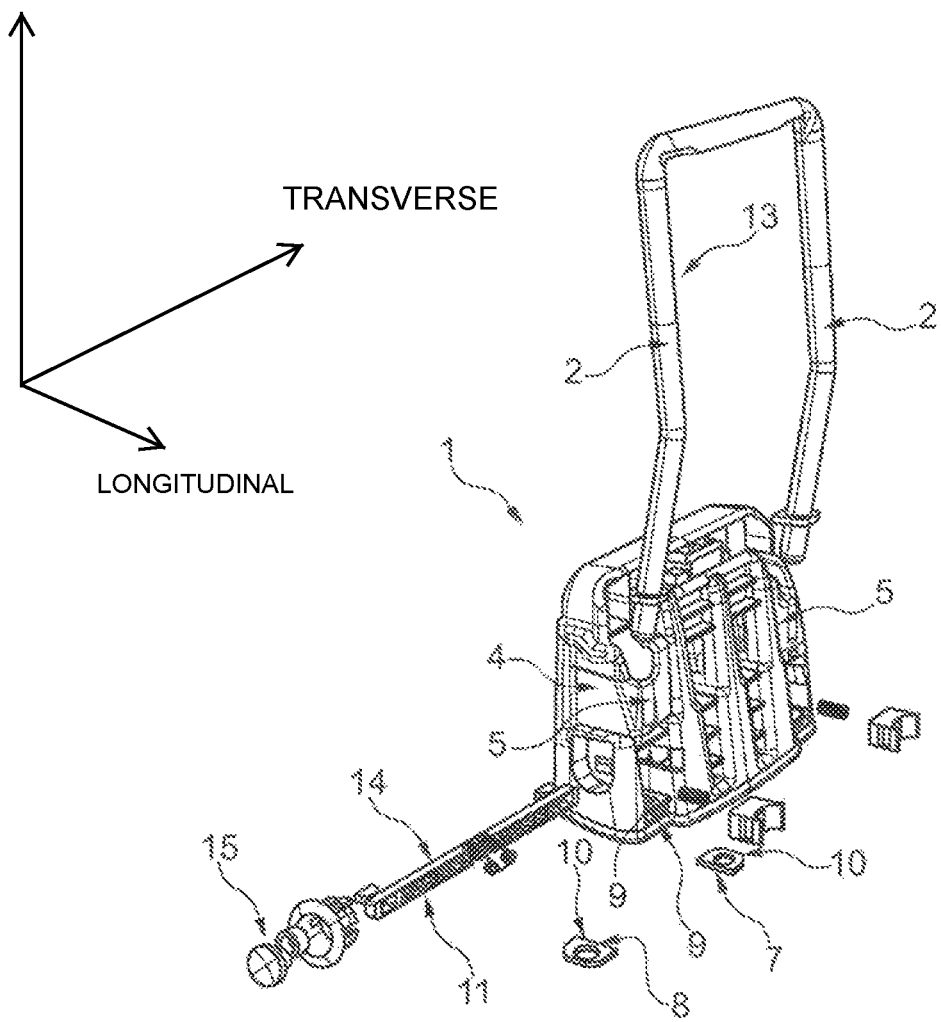
FIG. 1 is an exploded perspective view of a headrest according to one embodiment.
Figure 2:
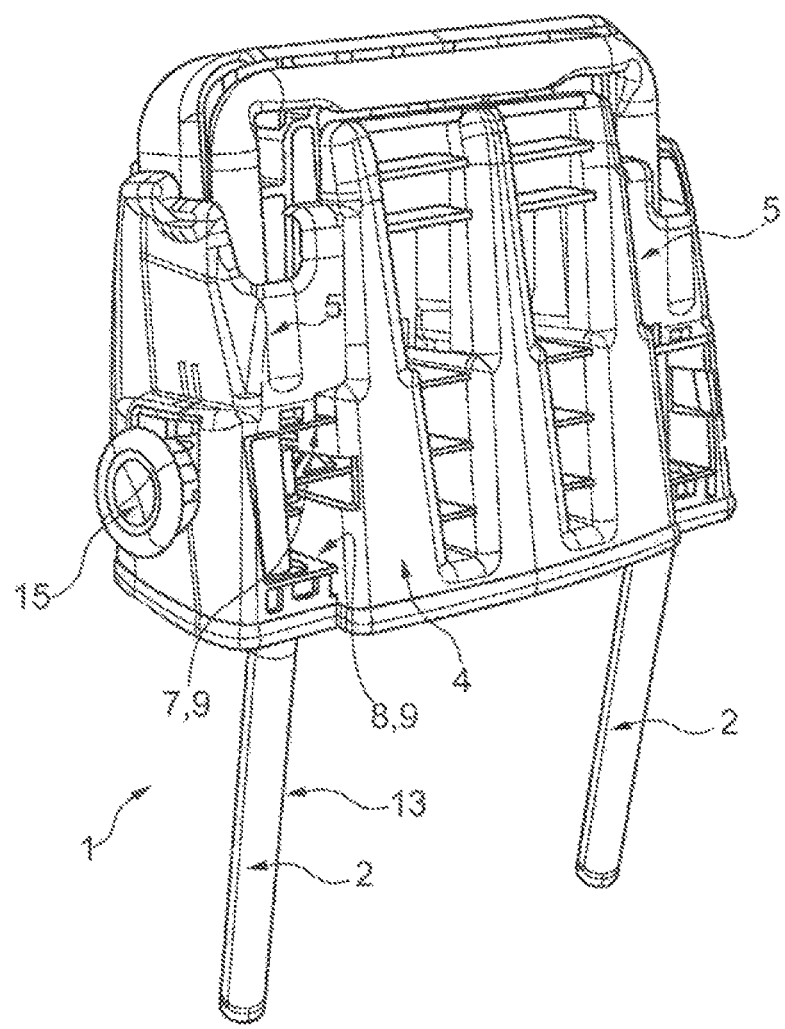
FIG. 2 is similar to FIG. 1, the headrest being assembled.
Figure 3:
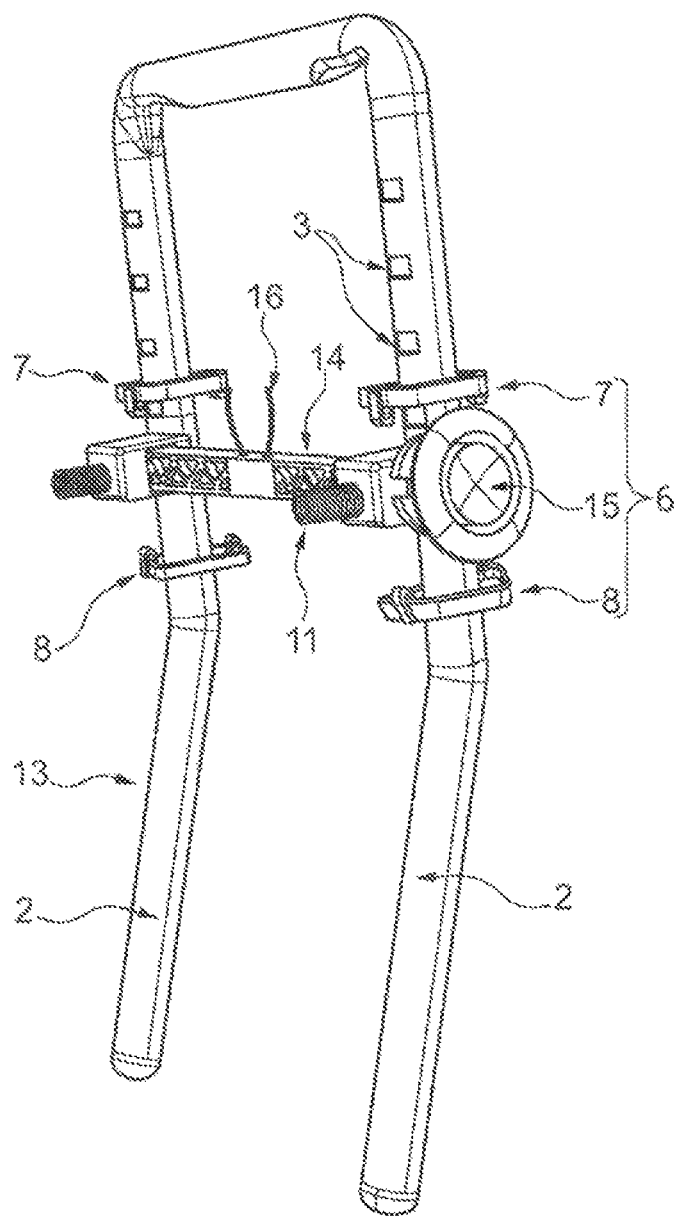
FIG. 3 is a perspective view of the frame of the headrest in the preceding figures provided with the locking device.
Figure 4:
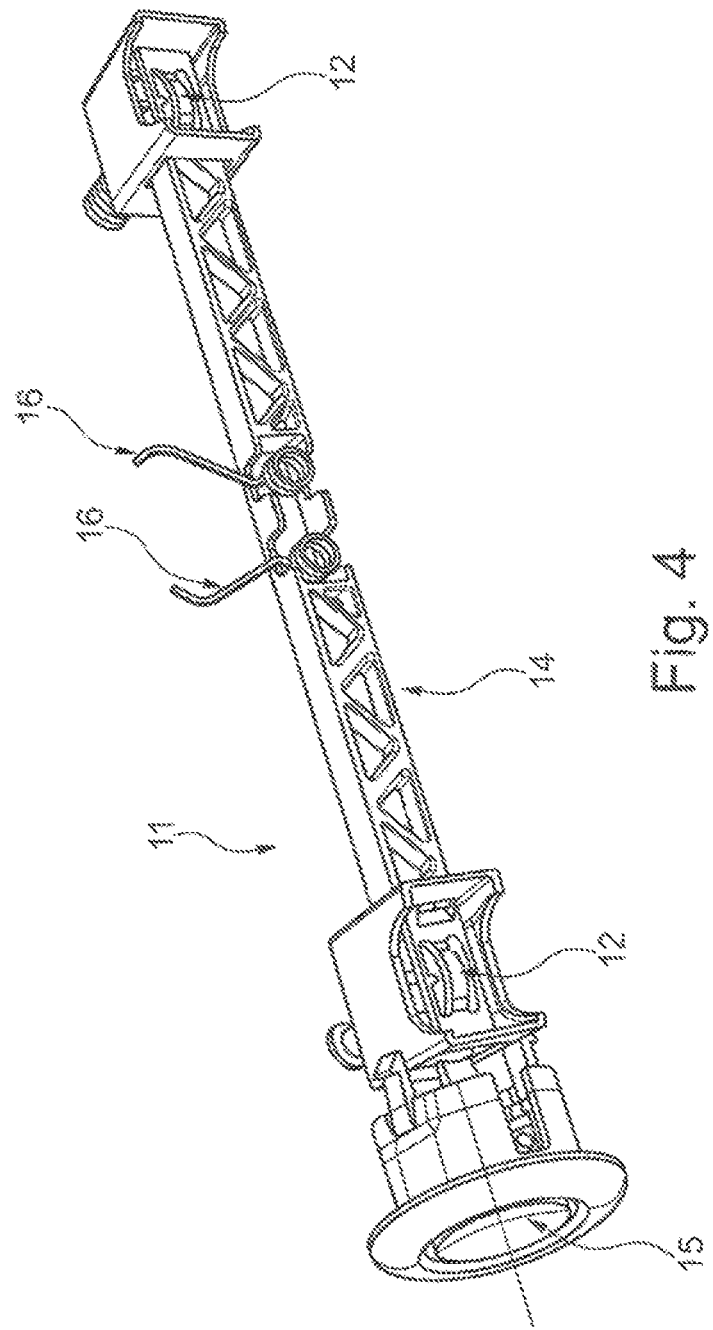
FIG. 4 is a detailed perspective view of the locking device of the headrest in the preceding figures.
Figure 5:
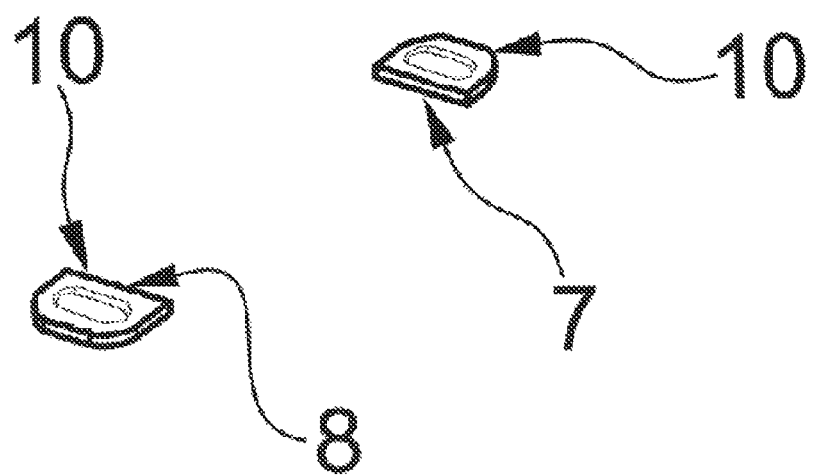
FIG. 5 is a detailed perspective view of an alternative embodiment of the bearings with oblong shaped openings.

With reference to the figures, a headrest 1 for a motor vehicle seat is described, the headrest comprising:

- two parallel rods 2 for connecting to the seat intended to be mounted at the top of the back of the seat, at least one—and in particular both in the embodiment shown—of the rods being provided with locking detents 3,
- a moulded plastic housing 4 for absorbing energy in the event of impact of a passengers head on the headrest, the housing being moulded in one piece, the housing comprising two channels 5 in which the rods can slide,
- a lining pad, not shown, of the housing whereon a passenger's head can rest,
- two sets 6 of bearings each comprising a top bearing 7 and a bottom bearing 8, each of the sets being mounted in a corresponding channel 5 by fitting the bearings into receptacles 9 provided in the housing, the receptacles being arranged so as to enable transverse travel of the bearings on either side of a nominal position, the bearings being provided with an opening 10 in which the corresponding rod 2 can slide,
- a locking device 11 for locking the housing relative to the rods in a plurality of vertical positions, so as to enable height adjustment of the pad, the device comprising at least one—two in the embodiment shown—locking projection 12 movably mounted relative to the housing between a locking position, where the projection is inserted into one of the detents, and an unlocking position, where the projection is removed from the detent so as to release the sliding of the corresponding rod,
- the rods being part of a frame 13 formed by a metal tube bent to take the general shape of an inverted U, the rods corresponding to the legs of the U.

According to the embodiment shown, the locking detents 3 are in the form of notches opening to the front.

According to the embodiment shown, the two rods 2 are provided with locking detents 3, the locking device 11 comprising a cross-member 14 mounted by transversal sliding in the housing 4, the cross-member comprising two locking projections 12, the cross-member being provided on one of the ends thereof with a push-button 15 suitable for actuating same from a locking position, where the projections are each inserted into a detent 3 of the corresponding rod 2, to an unlocking position, where the projections are removed from the detents, the headrest being further provided with a spring 16—herein with two branches suitable for actuating the button with a constant force—for returning the cross-member to the locking position thereof.

According to one embodiment, the openings 10 of the bearings 7,8 have an oblong shape in the longitudinal direction, so as to enable longitudinal travel of the rods 2 in the openings.

A risk of blocking of the sliding of the rods due to dimensional dispersions and/or temperature variations causing the dimensions of the housing 4 to vary is thereby prevented.

According to one embodiment, the receptacles 9 for receiving the bearings 7,8 are arranged so to prevent longitudinal and vertical travel of the bearings.

Such an arrangement helps prevent undesired vibrations along the longitudinal and vertical directions.

According to one embodiment, the bearings 7,8 are made of moulded plastic reinforced with a metal strip.

What is claimed is:

1. A headrest for a motor vehicle seat, the headrest comprising:
    two parallel rods for connecting to the seat intended to be mounted at the top of the back of the seat, at least one of the rods being provided with locking detents,
    a moulded plastic housing for absorbing energy in the event of impact of a passenger's head on the headrest, the housing being moulded in one piece, the housing comprising two channels in which the rods can slide,
    a lining pad of the housing whereon a passenger's head can rest,
    two sets of bearings each comprising a top bearing and a bottom bearing, each of the sets being mounted in a corresponding channel by fitting the bearings into receptacles provided in the housing, the receptacles being arranged so as to enable transverse travel of the bearings on either side of a nominal position, the bearings being provided with an opening in which the corresponding rod can slide,
    a locking device for locking the housing relative to the rods in a plurality of vertical positions, so as to enable height adjustment of the pad, the device comprising at least one locking projection movably mounted relative to the housing between a locking position, where the projection is inserted into one of the detents, and an unlocking position, where the projection is removed from the detent so as to release the sliding of the corresponding rod,
    the headrest being wherein the rods are part of a frame formed by a metal tube bent to take the general shape of an inverted U, the rods corresponding to the legs of the U.

2. The headrest according to claim 1, wherein the locking detents are in the form of notches opening to the front.

3. The headrest according to claim 1, wherein the two rods are provided with locking detents, the locking device comprising a cross-member mounted by transversal sliding in the housing, the cross-member comprising two locking projections, the cross-member being provided on one of the ends thereof with a push-button suitable for actuating same from a locking position, where the projections are each inserted into a detent of the corresponding rod, to an unlocking position, where the projections are removed from the detents, the headrest being further provided with a spring for returning the cross-member to the locking position thereof.

4. The headrest according to claim 1, wherein the openings of the bearings have an oblong shape in the longitudinal direction, so as to enable longitudinal travel of the rods in the openings.

5. The headrest according to claim 1, wherein the receptacles for receiving the bearings are arranged so to prevent longitudinal and vertical travel of the bearings.

6. The headrest according to claim 1, wherein the bearings are made of moulded plastic reinforced with a metal strip.

* * * * *